United States Patent [19]

Hughes

[11] Patent Number: 4,744,064

[45] Date of Patent: May 10, 1988

[54] METHOD AND APPARATUS FOR SEISMIC EXPLORATION

[75] Inventor: Philip A. Hughes, Houston, Tex.

[73] Assignee: Exxon Production Research Company, Houston, Tex.

[21] Appl. No.: 633,165

[22] Filed: Jul. 20, 1984

[51] Int. Cl.$^4$ ............................................. G01V 1/22
[52] U.S. Cl. ...................................... 367/22; 367/60; 367/62
[58] Field of Search ............................. 367/22, 62, 60; 364/133, 421

[56] References Cited

U.S. PATENT DOCUMENTS

| | | | |
|---|---|---|---|
| 4,072,923 | 2/1978 | Siems et al. | 367/78 X |
| 4,217,486 | 8/1980 | Tawfik et al. | 364/133 X |
| 4,276,620 | 6/1981 | Kahn et al. | 367/22 X |
| 4,319,347 | 3/1982 | Savit | 367/60 X |
| 4,351,025 | 9/1982 | Hall, Jr. | 364/133 X |
| 4,467,436 | 8/1984 | Chance et al. | 364/133 X |

Primary Examiner—Thomas H. Tarcza
Assistant Examiner—Mark Hellner
Attorney, Agent, or Firm—Alfred A. Equitz; Keith A. Bell

[57] ABSTRACT

Method and apparatus for digitally deriving arrays from seismic data. Indentical parallel processing elements connected between common input/output buses are each preselected to derive different pluralities of arrays. Array specifications defining the arrays are downloaded into the processing elements. A scan sample set of spatially distributed seismic receivers is periodically generated and placed on the input bus. Each processing element, in response to array specifications, captures and stores all receiver output signals in the scan required to derive its respective arrays, derives its assigned arrays, and delivers resultant array samples to the output bus. Double input and output buffering in the processing elements is provided whereby receiver capture, array derivation, and outputing processes occur simultaneously in each processing element.

30 Claims, 5 Drawing Sheets

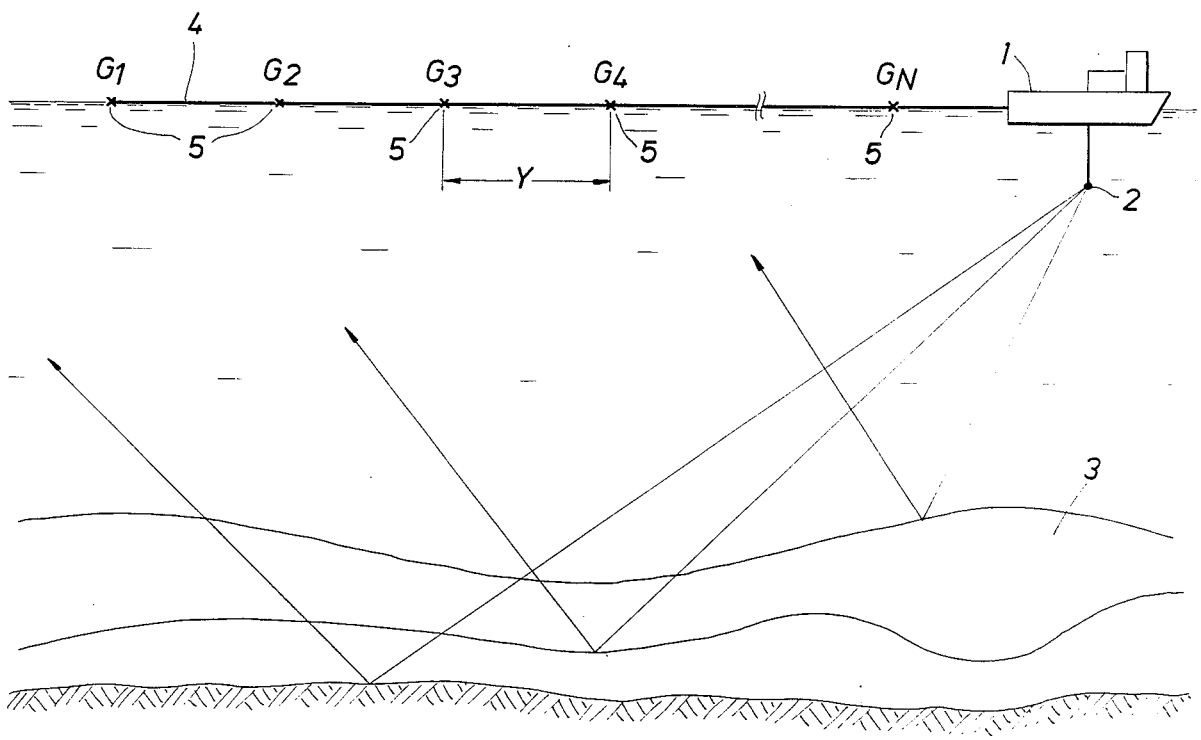

METHOD AND APPARATUS FOR SEISMIC EXPLORATION

BACKGROUND OF THE INVENTION

This invention relates to seismic exploration of earth formations and, more particularly, to methods and apparatus for acquisition and processing of marine seismic data from earth formations.

In seismic data acquisition and processing, it has been common practice to form arrays comprised of weighted sums of spatially distributed groups of seismic detectors for purposes of improving signal to noise ratios and the like well known in the art.

A general discussion of the theory and practice of such arrays may be found in articles entitled "Waveguides, Arrays, and Filters", *Geophysics*, Vol. 31, No. 3, pp. 501-505, by C. S. Clay, and "Characteristics of Seismic Streamers", *Geophysics*, Vol. 35, No. 6, pp. 1054-1075, by J. W. Bedenbender et al., which are incorporated herein by reference.

Two general approaches have been taken regarding the problem of forming these arrays. With reference to FIG. 1A, the first approach has been to simply record all of the analog detector group signals $G_1 \ldots G_n$ on tape 6 in the field, convert the data to digital form by analog-to-digital converter 7, and then feed the result as digital tape 8 into a general purpose processing computer 9 for purposes of deriving the desired arrays. A variation on this technique, as shown in FIG. 1B, is to provide for some form of digitization in the field, such as analog-to-digital converter 10, the output of which is recorded as digital tape 11 from which a general purpose processing computer 12 derives the desired arrays.

This approach has distinct advantages of reduced field hardware and associated operational problems, as well as the ability to compensate digitally in the general purpose computer for variations in specific receiver group parameters such as their sensitivities. However, a serious disadvantage is the inefficiency associated with the requirement of a general purpose computer for performing routine array formations better handled by a more specialized system. Furthermore, the resultant array traces are not readily available for field observation unless a computer is available for that purpose.

With reference to FIG. 1C, the second general approach may be seen depicted therein. Here, the desired arrays to be formed are created in the field, by use of analog methods. Thus, a precision resistor network is provided for supplying desired weighting coefficients for each of the component receiver signals as well as an operational amplifier for summing together various of the weighted samples comprising an array. Similarly, if another array is desired, another resistor network 15 and associated summing amplifier 16 would be required. For arrays comprised of large numbers of groups it may even be necessary to sum partial sums from amplifiers 14 and 16 into an additional amplifier 18.

Again, this approach has obvious benefits, most important of which is the elimination of the need for the general purpose processing computers of FIGS. 1A and 1B to perform the routine array forming. However, several serious drawbacks are nevertheless also associated with this technique. First, there are extremely difficult problems to overcome associated with the analog circuitry itself. These include the tremendous increase in hardware cost, size, maintenance, and difficulty of fabrication due to the hundreds of required patch connections, highly accurate and temperature-stable operational amplifiers and precision resistors, and the like. Problems are also experienced in degradation of signal to noise ratios due to summing amplifier drift and noise as well as noise and reliability problems associated with the various patchboards, connectors, and related wiring required in analog systems.

Yet another serious problem with the analog approach is the relative inflexiblity of such systems due to preselected weighting resistor values, limited patchboard connections and amplifier inputs, and the like. Moreover, reconfiguration of the arrays, system testing, and problem isolation was often manual and thus slow and unreliable.

Even with attempts to alleviate some of the aforementioned problems by providing for a more automated analog system with voltage controlled switches and variable gain amplifiers, severe problems still remained. Not the least of these was the difficulty of a host computer interacting and communicating with the array forming circuitry, such as in the performance of automated testing, and reconfiguring functions, again due to the analog nature of the system.

SUMMARY OF THE INVENTION

The method and apparatus of the present invention are for the acquisition and processing of seismic data, preferably of the marine type, although it is specifically contemplated that the invention need not be so limited and may be applied, for example, to land seismology as well.

A plurality of seismic receivers (or groups of receivers) $G_n$ are spatially distributed, preferably along an elongate cable trailing a vessel which traverses a marine earth section under investigation. Each group preferably includes a cluster of seismic receivers wired in parallel so that when a given individual receiver is instantaneously sampled, the output signal of the receiver corresponds to the instantaneous seismic acoustic signal incident upon the receiver.

Arrays consist of different combinations of spatially related receivers (or groups of receivers). It should be understood that hereinafter the term "receiver" will be used to denote a group of receivers wired in parallel as well as to denote an individual receiver. A preselected weighting coefficient is associated with each receiver in each receiver combination comprising an array. At discrete time intervals all receivers are substantially instantaneously sampled for their respective output signals. For every combination, the thus-sampled output signal from each receiver in the combination is multiplied by the respective weighting coefficient associated with the receiver in the combination, and resultant products are summed. Thus, an array signal is derived for each combination of receivers which is the weighted sum of all receiver outputs from the scan which are in the particular combination.

The receivers are then scanned during a next time interval for their next respective output signals. Again, for every combination, each of the resultant next output signals from each receiver in the combination is multiplied by its respective coefficient, the products summed, and a next array signal thus derived for each combination of receivers. The process continues with the result that additional array signals are derived from each subsequent scan of the receivers. This results in an array trace for each receiver combination. Each array trace is then comprised of a finite time series of array signals for the particular combination, each such array signal in the particular trace corresponding to a scan of the receivers at a different time interval.

In the method and apparatus of the present invention, an array former is provided comprised of a plurality of parallel digital processing elements, the purpose and structure of which will be hereinafter described in more detail, each having a common input and a common output bus. Stored in each processing element is predetermined array information comprising addresses corresponding to each receiver in each combination of receivers from which the particular processing element is to form array traces, the weighting coefficients for each receiver in each such combination, and addresses corssponding to each array to be formed by the particular processing element.

During a first time interval, a scan of output signals from all receivers sequentially appears on the input bus together with corresponding addresses which indicate the receivers from which each output signal in the scan originated. Each processing element compares each such address as it appears with the addresses it has stored, and every time an address match is detected, the processing element detecting the match captures and stores that corresponding output signal. At the completion of a given scan, each processing element has thus stored all receiver output signals in the scan which it requires to derive all of the array signals from the particular scan it has been assigned to derive.

During a next time interval, the parallel processing elements each simultaneously perform the aforementioned multiplication and summing functions to derive their respective assigned array signals.

During a third time interval, identification addresses corresponding to each array signal thus derived by the processing element sequentially appear on the output bus. Each processing element compares each such address as it appears with the addresses it has stored corresponding to each array signal it has derived. Every time an address match is detected, the processing element detecting the match delivers on the output bus the stored value of the array signal it previously had derived which corresponds to that address. At the end of the third time interval, every array signal derived by and stored in the processing elements has thus been delivered out of the processing elements and onto the output bus in its predesignated time slot.

More particularly, each processing element will, for each array signal it is assigned to derive, sequentially withdraw each of the captured and stored receiver output signals associated with the particular array signal, and then each such signal will be multiplied by its corresponding stored weighting coefficient. These products will be sequentially presented to an adder/accumulator as they are generated in the particular processing element until a sum of all such products comprising the particular array signal is reached within the accumulator. The value of the array signal will then be stored, and the process repeated until all such array signals assigned to the particular processing element have been derived and stored.

In a preferred embodiment of the invention, double input and output buffering is employed in each processing element. During a first time interval, selected receiver signals from a newly generated scan are captured from the input bus and stored in a first input buffer of a given processing element while those captured from an immediately preceeding scan and already stored in a second input buffer of the processing element are retrieved sequentially to derive the aforementioned array signals assigned to the processing element.

Similarly, array signals thus being derived by the processing element are sequentially accumulated as derived in a first output buffer. All array signals stored in a second output buffer (which were derived from captured receiver signals from a previous scan previously stored in one of the input buffers) are retrieved from this second output buffer and sequentially placed on the output bus.

During a next scan appearing on the input bus, and during a corresponding time interval, the second input buffer begins sequentially storing receiver signals captured from the input bus while those stored in the first input buffer during the first time interval are retrieved to derive the array signals assigned the processing element.

In like manner, during the second time interval, the array signals previously derived and accumulated in the first output buffer during the first time interval are delivered onto the output bus while those being sequentially derived during this second time interval are stored in the second output buffer. In this manner, receiver output signals from one scan can be captured and stored, those of an immediately preceeding scan may be retrieved for array signal derivations, and the resultant array signal values stored, and stored array signals derived from still an earlier scan may be placed on the output bus. Moreover, all such functions may thus occur in a "pipeline" fashion simultaneously whereby no one function is delayed until completion of another.

BRIEF DESCRIPTION OF THE DRAWINGS

FIG. 1D is a schematic diagram illustrating a conventional seismic cable being towed by a vessel for purpose of illustrating the seismic signals thereby generated.

FIG. 1E is a schematic diagram of several combinations of receivers of the seismic cable shown in FIG. ID, each such combination being associated with a different receiver array.

DETAILED DESCRIPTION OF THE PREFERRED EMBODIMENT

Figure 1A:
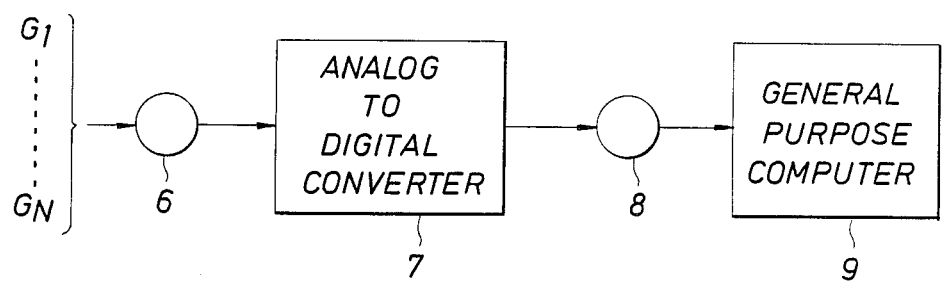
FIGS. 1A, 1B, and 1C are schematic diagrams of typical conventional approaches to seismic data acquisition and processing techniques.
Figure 1B:
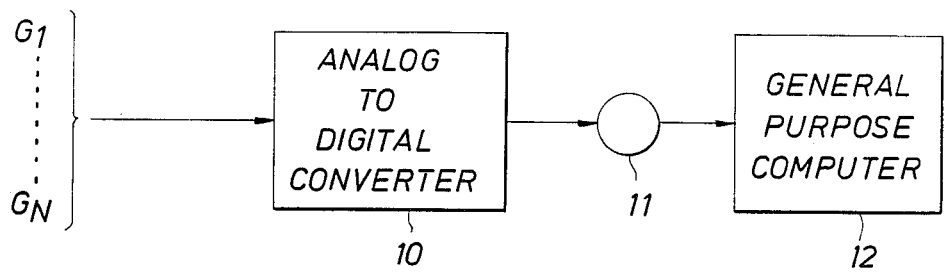

Referring first to FIG. ID, there will be seen depicted therein schematically an illustration of a typical marine seismic exploration operation. In such operations, a vessel 1 carries a seismic energy source 2 over a submerged earth formation 3 of interest. Energy emitted from the source 2 impinges upon the formation causing return energy (shown by the arrows) to travel in a generally upwards direction toward an elongate cable or streamer 4 which trails behind the vessel 1. 20. The streamer 4 is comprised of a plurality of seismic energy receivers or detectors 5 (also shown as receiver groups $G_1 \ldots G_n$, each of which groups includes one or more of receivers 5), each receiver group being generally uniformly spatially distributed by distance Y from adjacent receiver groups. In general, the purpose of each detector 5 is to receive seismic energy returned from formation 3, and to convert such energy incident thereupon into an electrical measurement signal. The measurements are thence transferred via streamer 4 to vessel 1 for recording, processing, analysis, and the like, In order to yield information concerning subsea earth formation 3.

It should be understood that it is conventional for groups $G_1, G_2, \ldots, G_n$ each actually to be comprised of a plurality of hydrophones wired in parallel, so that the receiver output signal from a particular group is actually a composite of all the signals from the hydrophones in the particular group. Thus, reference hereinafter to a particular receiver output signal will actually be a reference to the composite signal from a particular group and, further, reference to a "scan" will be a reference to a plurality of such samples taken (usually substantially simultaneously) from the plurality of spatially distributed groups. It should further be appreciated that for a selected period after detonation of the seismic source, additional scans of detectors 5 may be generated at uniform time intervals prior to a next detonation and subsequent scans.

It will be appreciated that FIG. ID is provided only for purposes of depicting generally a seismic marine operation wherein seismic energy samples are simultaneously derived at a plurality of locations within the water above a submerged formation of interest 3, and that the particular arrangement of receiver groups $G_1 \ldots G_n$, including their spacing, order and form of delivery of their measurements to the vessel 1, and the like are matters of engineering choice well known in the art.

For example, in some instances, it is preferable to trail a plurality of such streamers behind the vessel 1. Thus, combinations of detectors as hereinafter described are not limited only to those occurring in a line such as depicted in FIGS. 1D and 1E (to be discussed below). On the contrary, detectors lying on a line or lines perpendicular or diagonal to the streamers could be selected, or such detectors may be selected from several streamers to fine and thus cover a preselected geometric area of any desired shape such as a rectangle or the like.

Moreover, in the past, it has been conventional to deliver the receiver output signals produced by detectors 5 to the vessel 1 in the form of analog signals. However, due to innovations in digital technology, it is also conventional to provide, for example, for instrumentation, digitization, amplification, filtering, control, and the like, within the streamer itself of the receiver output signals, whereby a stream of digital data may be delivered via streamer 4 to vessel 1 corresponding to measurements made by various detectors 5.

Referring now to FIG. 1E, there will be seen depicted therein a schematic representation of only a few combinations of receiver signals which may be used from a given scan from the streamer 4. In marine seismic work, in like manner to the formation of a composite signal for a given group from its respective hydrophones, it is conventional to form various combinations of measurements or receiver output signals for a scan of the various groups $G_1, G_2, \ldots G_n$ of detectors 5, for purposes well known in the art such as rejection of random and coherent noises with attendant improvements and signal to noise ratios, and the like. With further reference to FIG. 1E, array 1 will be seen to schematically indicate that the combination of groups from the streamer in that particular array (as indicated by dots) is comprised of a series of receiver output signals from each group $G_1$, each of which may be weighted in a manner to be hereinafter described in accordance with the teachings of the present invention.

However, reference to array 2 indicates that, in the alternative, it may be desirable to retrieve only receiver signals from selected groups at the vessel 1, and thus array 2 indicates that a possible such arrangement of signals to form array 2 may be comprised of every other signal from a given scan of all groups $G_1, G_2, \ldots, G_n$ during a time interval. Thus array 2 would be comprised of the series of receiver output signals $G_2, G_4, G_6, \ldots, G_n$. Again, as will be hereinafter described in greater detail, each of these selected signals may, of course, be weighted as will be described.

It will be appreciated that generally a given combination of groups used with a scan to form an array signal is comprised of evenly-spaced groups as in Array 2. However, in order to emphasize the generality and applicability of the present invention beyond conventional or limited particular selections of group signals, several other possible combinations of receiver groups will be illustrated.

Thus, Array 3 of FIG. 1E illustrates, as hereinbefore noted, that in some instances it may be desirable to combine receiver output signals from various groups, and thus Array 3 is comprised of a composite signal of groups $G_1$ and $G_2$, $G_4$ and $G_5$, $G_7$ and $G_8$, ..., etc. In like manner, Array 4 is comprised of groups $G_2$ and $G_3$, $G_5$ and $G_6$, and $G_8$, and $G_9$, ..., etc. Array 4 is intended to indicate that not only may various groups be summed to for a composite sample, but that in a given application, a given pattern may be located anywhere along the streamer 4. Thus, with respect to Array 4, the combination pattern of signals from the groups comprising Array 3 will be seen to have been displaced whereby Array 4 will be comprised of a series of composite data samples of $G_2$ and $G_3$, $G_5$ and $G_6$, $G_8$ and $G_9$, etc.

Array 5 of FIG. IE illustrates that in some applications it is desirable to derive an array signal which includes more than two adjacent receiver outputs. Thus, Array 5 would have a functional combination of outputs in a given scan from groups $G_3, G_4, G_5$ and $G_6$; a combination of outputs from groups $G_8, G_9, G_{10}, G_{11}$, and so forth. Finally, Array 6 illustrates that the same number of group signals need not be combined each time along the streamer 4, and thus Array 6 is comprised of five signals from groups $G_1$–$G_5$, and six signals from groups $G_8$–$G_{13}$. Moreover, further inspection of the arrays depicted in FIG. IE reveals that not only may the total number of group signals added to form a particular Array vary, but it may even be desired to vary the space between collections of groups or subgroups. Thus, for example, with reference to Array 5, a distance of 2Y may be provided between subgroups ($G_3$–$G_6$) and ($G_8$–$G_{11}$), whereas a distance exceeding 2Y may be provided from group $G_{11}$ to the next collection of groups (not shown) which will be summed with the other subgroups to provide an array signal or element for a given scan.

In order to clarify the following discussion regarding formation of arrays, certain terms previously mentioned and used more extensively hereinafter will next be explained. A "scan" refers to the group of signals resulting from a sampling of all groups or receivers in a streamer or streamers (there may be one thousand or more of such groups or receivers in a single streamer) during a given time interval. A scan of one thousand group samples typically may occur in as little as one millisecond (which for practical purposes, will be referred to herein interchangeably as occurring either during a time interval or instantaneously), resulting in an overall acquisition frequency of 1 MHz. It will be noted that such scans will desirably be repeated successively with minimal "dead time" between scans.

Next, it will be recalled that in accordance with the present invention different combinations of receiver groups may be preselected for purposes to be discussed shortly, each group having a receiver output signal associated with it during a given scan. It should be understood that for a given combination of groups and corresponding receiver output signals during a scan, the weighted sum of all such output signals occurring during the scan will be referred to herein as an "array signal". In other words, an array signal is derived when each receiver output signal for the given combination of groups forming the array is multiplied by a respective weighting coefficient and all the resultant products summed.

It will further be noted that a next array signal may be derived from a next scan for this same combination of groups by taking each receiver output signal present during the next scan from each group comprising the particular combination, multiplying each such signal by its corresponding same weighting coefficient, and summing the products.

A series of such array signals, each derived from a different scan and thus a different time interval but from the same combination of groups shall be herein referred to collectively as an "array trace". In other words, an array trace is a finite time sequence of array signals.

The foregoing may be more clearly seen by use of conventional matrix notation wherein, for a given scan interval, $$A = C \times G,$$

where
A = an m-component vector of all arrays produced or combinations of groups,
C = an m×n coefficient matrix which defines weighting coefficients for each of n groups in each of m arrays,
G = a vector of all ordered receiver output signals from each of n groups, acquired during the scan interval, and wherein $$A_i = \sum_{j=1}^{n} C_{ij} G_j$$

where $A_i$ is the $i^{th}$ array element.

It will be noted that the coefficients in the coefficient matrix may be selected, by letting some coefficients of C equal zero, such that some components of G will not appear in the A, summation. Thus any combination of components of G may be accordingly included in the $A_i$ summation.

The reasons for weighting receiver output signals which are summed into an array are well known in the art. The primary result of such weighting is the artifical alteration of the spatial sensitivity pattern of the groups comprising the particular array or equivalently, the alteration of the two-dimensional frequency response of the array. Numerous such weighting schemes are known in the art such as non-tapered, exponentially tapered, or Chebyshe-tapered array weightings. More detailed information regarding the sensitivity and weighting of arrays may be found in "Optimization and Implementation of Marine Seismic Arrays" by M. Schoenberger, *Geophysics*, Vol. 35, No. 6, pp. 1038–1053; and "Chebyshev Optimized Geophone Arrays" by M. Holzman, *Geophysics*, Vol. 28, No. 2, pp. 145–155, respectively, which are incorporated herein by reference. It is specifically contemplated that the present invention is particularly suited to employ one or more weighting schemes, including those discussed, each to be used in forming a different array. Accordingly, the invention is not intended to be limited in scope to any particular weighting functions. This is especially true inasmuch as coefficients for a number of different weighting functions may be easily and conveniently downloaded by software and stored in corresponding processing elements of the invention (to be discussed later), and such coefficients may thus also conveniently be changed at will.

It is further contemplated that coefficients of the present invention may, if desired, each be a composite or combined coefficient which not only weights the respective receiver signal according to one of the aforementioned weighting schemes, but also adjusts or compensates the particular corresponding receiver's sensitivity normalization for uniformity to that of the other receivers. Thus, $C_{ij}$ above may be a sensitivity normalization coefficient multiplied by a weighting coefficient and stored in a processing element as one number, so as to accomplish weighting and sensitivity compensation in one mathematical operation in the processing element.

Due to varying sensitivities of hydrophones comprising a given group or due to signal leakage along the streamer due to invasive seawater or the like, it is reasonable to expect that non-uniform signals will result from the group in response to identical successive inputs. Depending on the extent of these conditions and the type of array, these conditions could have a highly deleterious effect on overall array response. Thus, it is desirable to compensate for weak receiver groups and such non-uniformity.

Illustrated below are examples of some array samples which might be formed for a given scan. The preceeding matrix notation is not used however, in these examples, but rather different letters for coefficients in a different array are used to emphasize that there need be no particular relation between coefficients of one array and those of another.

Thus, with reference to the following table and FIG. IE, it will be noted that in the general case, array 1 for a given scan and combination of receiver outputs from groups $G_1-G_k$ will be comprises of a sum of a series of terms each taking the general form $G_i X_i$ where $X_i$ is the multipler or weighting coefficient for that particular receiver output measurement $G_i$. Moreover, the table indicates that the array signal of array 1 therein depicted is a sum of all of the weighted receiver output signals.

| ARRAY # | |
|---|---|
| 1 | $G_1I_1 + G_2I_2 + G_3I_3 + \ldots G_kI_k$, where $3 < k \leq n$ |
| 2 | $G_2J_2 + G_4J_4 + G_6J_6 + G_8J_8 + \ldots$ |
| 3 | $(G_1K_1 + G_2K_2) + (G_4K_4 + G_5K_5) +$ $(G_7K_7 + G_8K_8) + (G_{10}K_{10} + G_{11}K_{11}) + \ldots$ |
| 4 | $(G_2L_2 + G_3L_3) + (G_5L_5 + G_6L_6) +$ $(G_8L_8 + G_9L_9) + (G_{11}L_{11} +$ $G_{12}L_{12}) + \ldots$ |

| ARRAY # | -continued |
|---|---|
| 5 | $(G_3M_3 + G_4M_4 + G_5M_5 + G_6M_6) +$ $(G_8M_8 + G_9M_9 + G_{10}M_{10} + G_{11}M_{11})$ $+ \ldots$ |
| 6 | $(G_1N_1 + G_2N_2 + G_3N_3 + G_4N_4 +$ $G_5N_5) + (G_8N_8 + G_9N_9 + G_{10}N_{10} +$ $G_{11}N_{11} + G_{12}N_{12} + G_{13}N_{13}) + \ldots$ |

Note that array 1 is limited in extent to receivers $G_1$–$G_k$, where $k \leq n$. Similar limitations on extent are also implied for arrays 2 through 6. [p In like manner, with reference to array 2 in the above table, it will be seen that for a given scan, array 2 will be comprises of a sum of the series of receiver output signals or group samples $G_2$, $G_4$, $G_6$, etc., each weighted by its respective weighting factor $J_2$, $J_4$, $J_6$, etc. Similarly, array 3 will be seen to have, as the array element depicted above, the sums of $G_1$ and $G_2$ each weighted by their respective weighting factors $K_1$ and $K_2$ plus the sum of the weighted group signals $G_4$ and $G_5$ and so on. From reference to FIG. 1E, it will be recalled that for reasons hereinbefore noted, certain of the group signals such as $G_3$, $G_6$, $G_9$, and so on, in the case of array 3 will have been omitted. With reference to the coefficient matrix previously described, the absence of these samples is indicated equivalently in that $C_{33}$, $C_{36}$, and $C_{39}$, ..., are set to zero.

Figure 1C:
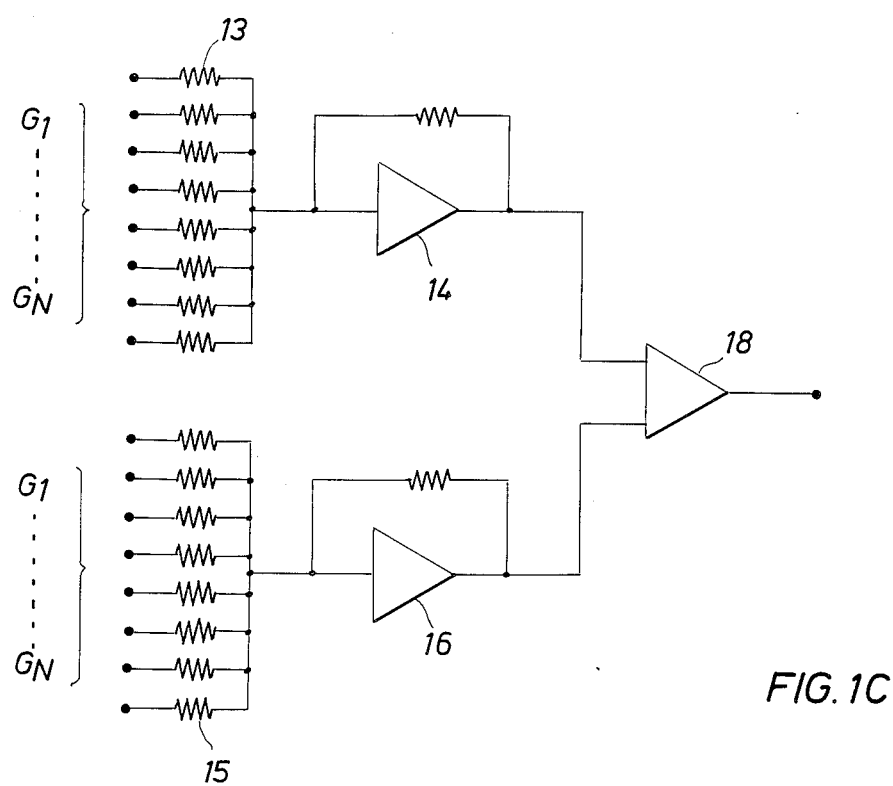

In a typical conventional marine seismic operation, as many as one thousand or more group or receiver output signals may be generated during one scan, each of which must be desirably weighted over a continuous range of coefficients. Moreover, it is conventional to generate not just one array corresponding to just one combination of groups evaluated at a plurality of scans or successive time intervals (such as one of those depicted in the above table) but as many as two hundred or more different arrays, each comprised of from two to thirty or more different weighted group samples. Thus, the severe limitations of the analog approaches of the prior art, such as those depicted in FIG. 1C, may now be more clearly appreciated.

Figure 2:
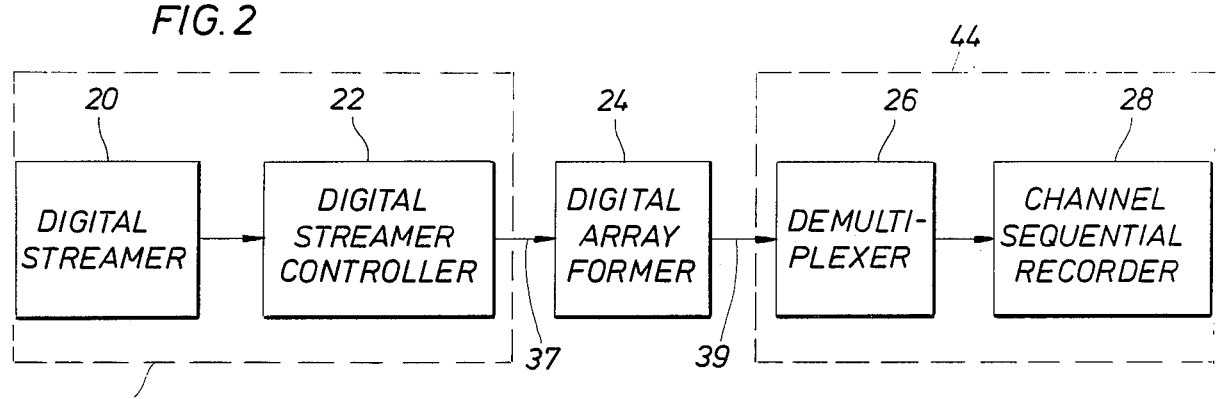
FIG. 2 is a block diagram depicting generally the seismic exploration apparatus of the present invention.

FIG. 2 depicts a general block diagram of one embodiment of the seismic exploration system of the present invention which overcomes the hereinbefore noted problems of conventional approaches.

Digital streamer 20 is provided to serve the purpose of the streamer 4 of FIG. 1D. Whereas, as discussed, the various receiver output signals in some applications may still be delivered to vessel 1 in analog form where they may be thence converted to digital form, in a preferred embodiment for marine applications, streamer 20 will deliver digital representations of each group output to vessel 1 in any one of a number of well known formats and typically in bit-serial form. Thus, the present invention is not intended to be limited to any particular format, sampling or arrangement of detectors 5. More than one digital streamer 20 may be towed by vessel 1, if desired.

Still referring to FIG. 2, the digital data comprised of the digitized receiver output signals obtained from a scan of the groups $G_n$ is delivered to digital streamer controller 22, which provides an interface between a given digital streamer 20 and digital array former 24 of the present invention. Thus, controller 22 will configure the data from a digital streamer 20 into a format with appropriate timing for delivery to the digital array former 24 on output line 37 in a manner to be hereinafter described in greater detail. The general function of the digital streamer 20 and controller 22 is to provide digital array former 24 with appropriate digitized data signals from receiver 5, and thus streamer 20 and controller 22 will be collectively referred to as host digitizing system 32 (depicted in FIG. 3, to be discussed below, as well as in FIG. 2).

It should be recognized that in another embodiment of the invention, host digitizing system 32 includes one or more analog streamers, which deliver signals in analog form to vessel 1, and an analog to digital converter for converting the analog signals to a digital format suitable for subsequent processing in digital array former 24.

Still referring to FIG. 2, digital array former 24 is provided to receive a multiplexed digitized data stream typically consisting of singular or multiple bit-serial lines. The lines carry the various group measurements or receiver outputs to array former 24 which derives array samples in accordance with the predefined coefficient matrix and outputs these array samples on output line 39 to demultiplexer 26. Demuliplexer 26 reorders the scan-ordered array signals from scan sequential ordering to channel sequential ordering so that the reordered array signals may be recorded and viewed as array traces by channel sequential recorder 28. In like manner to the streamer 20 and controller 22, it will be appreciated that the general purpose of demultiplexer 26 and recorder 28 is to record the array sample data stream thus formed by array former 24. Thus, these elements will be referred to collectively as host recording system 44 (depicted in FIG. 3, to be discussed below).

Figure 3:
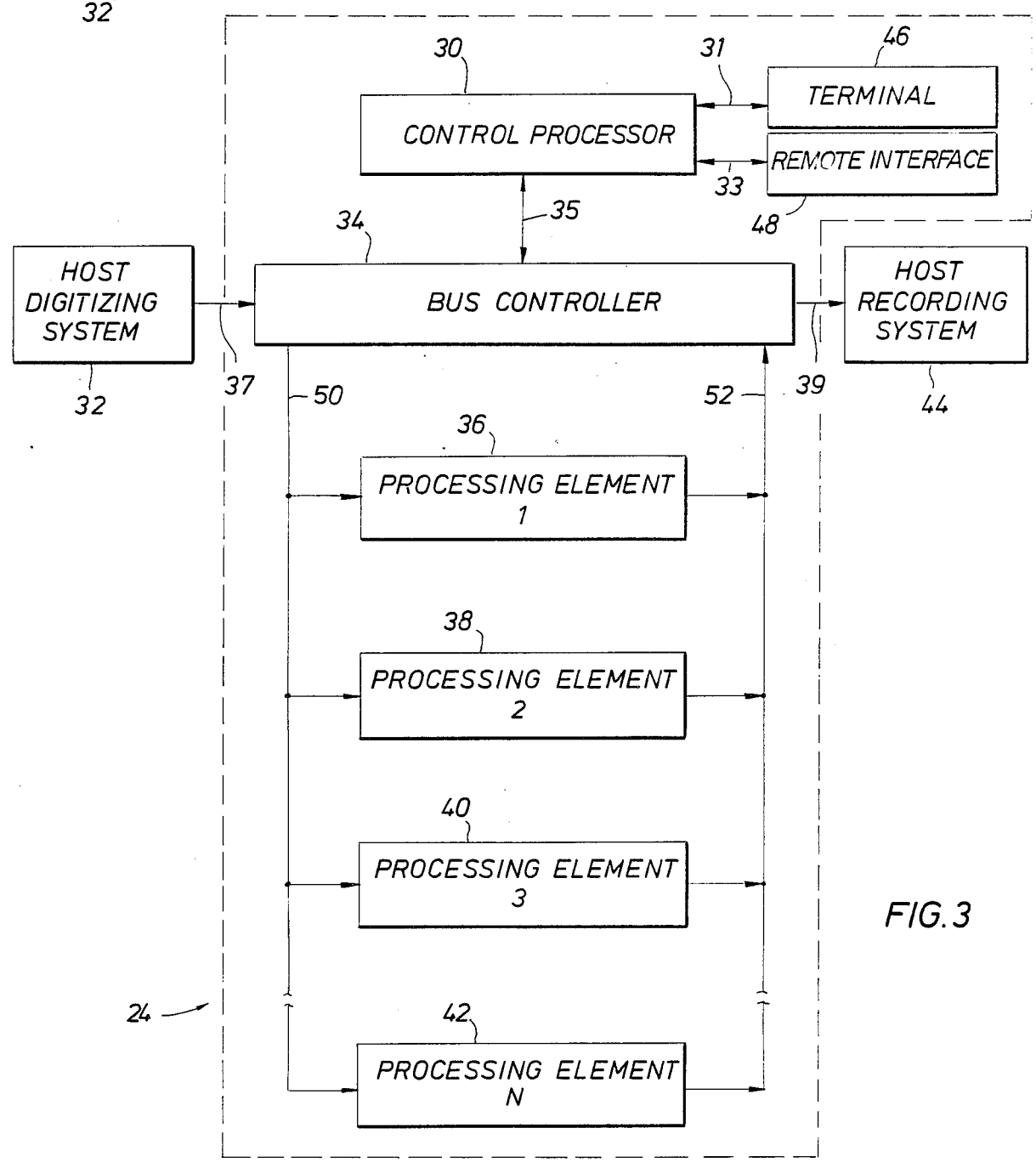
FIG. 3 is a more detailed block diagram of the seismic exploration apparatus depicted in FIG. 2.

FIG. 3 is a block diagram depicting in more detail the seismic exploration system depicted in FIG. 2 and, in particular, includes a more detailed block diagram of the digital array former 24 of FIG. 2. For purposes of clarity, the overall operation of the system depicted in FIG. 3 will be discussed in first generally and thereafter in more detail, particularly with reference to the various processing elements 36–42 of FIG. 3. Moreover, henceforth what was previously referred to as a signal will sometimes be referred to as a sample or data sample in the description which follows.

Digital array former 24 includes bus controller 34 interconnected to the aforementioned host digitizing system 32 and host recorder system 44 by lines 37 and 39. In addition, the array former 24 includes control processor 30 interconnected to the bus controller 34 by means of line 35. Data flow to and from array former 24 is conducted over two synchronous buses, input bus 50 and output bus 52. While shown simply as a single line, each bus 50 or 52 will be understood to include three buses of the types commonly used in digital systems, namely a data bus which conveys sample data or configuration information depending upon mode of operation (to be described below), an address bus for addressing specific ones of the respective components of the system and identifying the source of the particular data on the data bus, and a control bus of the type well known in the art for providing various timing and strobing signals. The address bus serves a dual purpose. In the configuration mode, it provides the ability to address a particular processing element (to be described) for downloading configuration data. In the active mode, it identifies the particular groups from which group samples on the input bus originated and further identifies array samples desired on the output bus during each scan.

The function of bus controller 34 will now be discussed in greater detail. The bus controller 34 serves several purposes. First, after accepting data on line 37 from host digitizing system 32, bus controller 34 performs data reformatting in one of a variety of ways well known in the art to ensure that the data delivered on input bus 50 is in a format compatible with the various processing elements 36–42. Likewise, data reformatting is also provided in the output data path from output bus 52 to line 39 to convert the data to a format compatible with host recording system 44.

Secondly, bus controller 34 will include a counter which is reset to zero at the start of a given scan. The purpose of the counter is to generate input scan addresses delivered to each processing element on input bus 50 uniquely identifying which receiver group sample is on the input data bus 50 at a particular time. This enables the processing elements to capture from input data bus 50 only those receiver group samples required by the particular processing element to form its respective array samples.

Furthermore, bus controller 34, after appropriate resetting of the counter at the beginning of each scan in like manner to that described above, generates output addresses sequentially corresponding to array samples to be formed by processing elements 36–42. This enables bus controller 34 to accept these array samples which are placed on output bus 52 by each processing element, further enabling bus controller 34 to identify each of the array samples being presented on output bus 52 at a particular time.

In like manner to reformatting the incoming receiver samples prior to presentation on input bus 50, bus controller 34 will also reformat the array samples appearing on the output bus 52 in a manner well known in the art into a form compatible with host recording system 44.

Bus controller 34 also performs basic control and timing functions for input bus 50 and output bus 52. In particular, bus controller 34 will compensate for data transfer timing discrepancies between host digitizing system 32 and input bus 50 and between host recording system 44 and output bus 52. The required timing adjustments and the method by which they are effected are matters of engineering judgment in the context of a specific host digitizing system 32 and host recording system 44. In one embodiment two first-in first-out buffers are provided. One buffer is placed in the input data path from line 37 to input bus 50 and allows data presentation on input bus 50 to be relatively independent of the rate of data transmission from host digitizing system 32 during each scan interval. The other buffer is placed in the output data path from output bus 52 to line 39 and serves a similar purpose of allowing data transmission timing to host recording system 44 to be relatively independent of timing on output bus 52 during a given scan interval. Furthermore, in such embodiment each of these buffers has sufficient capacity to hold all samples conveyed over its respective data path during a given scan interval. Thus the buffer in the input data path has capacity to contain one sample from each group $G_i$. Similarly, the buffer in the output data path has capacity to contain one sample for each array formed by collective processing elements 36–42. With reference to aforementioned format conversions for data entering and leaving digital array former 24, circuitry performing the input or output data conversion may be placed either before or after the respective first-in first-out buffer.

Referring to the aforementioned configuration mode of operation (to be further described below), bus controller 34 assumes a transparent state upon command by control processor 30. In this configuration mode the bus controller provides a direct internal connection from line 35 to input bus 50, and control processor 30 then utilizes the address lines of input bus 50 to select specific ones of processing elements 36–42 and to further select within each selected processing element one of input selection RAM 68 (shown in FIG. 4), output selection RAM 78 (shown in FIG. 4) or control RAM 94 (shown in FIG. 5). Remaining address lines will address specific locations within the selected RAM. As each RAM location is thus addressed, control processor 30 places the value to be loaded onto the data lines of input bus 50 and issues a data strobe over one control line of input bus 50.

In one embodiment control processor 30 is a microprocessor based system with attendant read only memory, random access memory and interfaces for terminal 46 and remote interface 48. In such embodiment, the address and data lines used to download the array specification instructions to the processing elements 36–42 are taken directly from the internal bus of the control processor 30 with provisions for suitable buffering and address mapping. Using this method RAM's 68, 78, and 94 of processing elements 36–42 may be accessed directly by control processor 30 in the same manner that it accesses its own local memory.

A plurality of processing elements 36–42 are provided interconnected in parallel between input bus 50 and output bus 52. Although four processing elements 36–42 are shown in FIG. 3, more or less than four may be provided. The purpose of the processing elements is to simultaneously form array samples from the component group samples delivered on input bus 50 as prescribed by instructions stored in a control RAM (random access memory) by control processor 30 and to output these formed array elements on output bus 52 for recording in recording system 44 or the like. Processing elements 36–42 will be discussed hereinafter in greater detail with reference to FIGS. 4 and 5.

The system shown in FIG. 3 preferably operates generally in either a configuration mode or an active mode. In the configuration mode bus controller 34 becomes transparent relative to the control processor 30 and processing elements 36–42, thereby permitting control processor 30 to compute and download coded array specifications into the processing elements via input bus 50. Terminal 46 and remote interface 48 interconnected to control processor 30 by lines 31 and 33 are further provided for numerous purposes. For example, the terminal may be utilized to monitor status and information relating to the digitizing system 32, the processing elements 36–42, or recording system 44, or to run diagnostics. Moreover, terminal 46 may, for example, be utilized to input specific array forming information into control processor 30 for downloading to the processing elements. Similarly, through interface 48, digital array former 24 may be fully controlled, tested, and configured by the host computer. Thus, interface 48 may be utilized for purposes of downloading programmed array specifications through control processor 30 to the processing elements, or for running test or calibration programs relating to the rest of the system such as receiver group sensitivity test measurements and the like.

It is contemplated that a host computer at a remote location might transmit only brief array-defining specifications to control processor 30 which would interpret these specifications and download three sets of instructions to be described below, to the processing elements. Further, it is anticipated that one coefficient matrix which might initially be sent to the processing elements would be the identity matrix, for purposes of passing all group samples through to the host system unweighted for analysis. The results of this analysis would then be used to compensate for the aforementioned group sensitivity differences.

Still referring to the configuration mode of the system of the present invention, as hereinbefore noted, bus controller 34 is thus transparent to control processor 30, enabling the control processor to download via in-put bus 50 to the processing elements the instructions to form arrays. These instructions include digital data to be stored in each respective processing element 36-42 instructing the given element which arrays it is to form, which groups in streamer 20 are required to form all such arrays, and the weights (or coefficients) by which each of the groups is to be multiplied.

More particularly, the information downloaded to Processing elements 36-42 is comprised of the following. First, one set of data is downloaded to each respective processing element to be stored in input selection RAM 68 (shown in FIG. 4) of each processing element. This information is used by the respective processing elements to capture or pick off from input bus 50 all samples in a given scan required by the particular processing element to form the array signals which have been assigned to it.

A second set of data downloaded to control RAMS 94 of the various processing elements defines the aforementioned coefficients to be applied to the respective groups in each array; and still a third set of downloaded information is stored in output selection RAM 78 (shown in FIG. 4) for each processing element. More particularly, this latter information will define when each array sample formed by each processing element is to be placed on output data bus 88 after formation, in response to an output address appearing on output address bus 64 (to be described hereinafter in greater detail).

Control RAM 94 (to be described below with reference to FIG. 5) for each processing element will include one set of information for each array to be formed by the given processing element. The set of information will include an ordered set of the hereinbefore noted coefficients with indications of which samples in input data RAMS 74 and 76 need to be applied to the particular coefficients. Control RAM 94 further contains an instruction utilized after a particular array sample is formed to indicate the unique location wherein that array sample is to be placed in output RAM 80 or 82. The last instruction in control RAM 94 stops control address sequencing and resets the address to zero in preparation for processing the next scan of receiver samples contained in input data RAM 74 or 76.

With respect to the active mode of operation, bus controller 34 controls the input and output buses 50 and 52, and control processor 30 is in a monitoring mode. Array former 24, during the active mode, operates continuously and simultaneously in three overlapped processes, e.g., input, compute, and output.

In the input process, all of the group data samples of a given scan are sequenced onto input bus 50 at a rate which may exceed 1 MHz, for example in one particular embodiment. In this embodiment, one thousand such group samples comprising a scan are placed onto the input bus such that each sample would appear once on the input bus during a one millisecond scan interval. Bus controller 34 provides for a "dead" period at the end of each scan so that the processing elements 36-42 can set up for the next scan. This set up process (to be described below with reference to FIG. 4) comprises resetting the RAM address counters in RAM 68 and RAM 78 (shown in FIG. 4), and toggling the input and output RAMS 74, 76, 80, and 82 (shown in FIG. 4).

Figure 4:
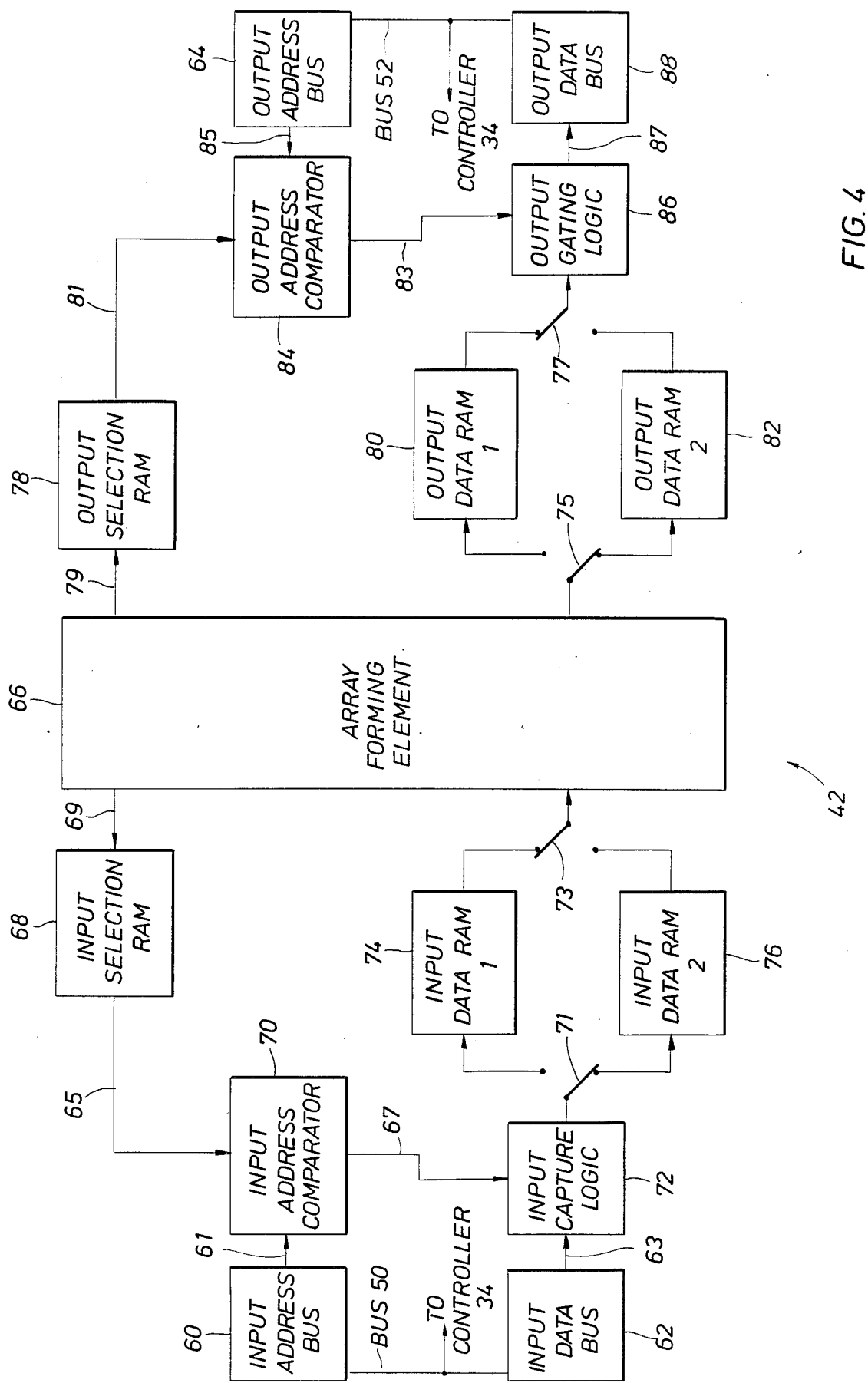
FIG. 4 is a more detailed block diagram of one of the processing elements depicted in FIG. 3.

FIG. 4 is a functional block diagram depicting in greater detail processing element 42 of FIG. 3. In accordance with the present invention, each of processing elements 36-42 will desirably be of the same construction and thus the description of processing element 42 which follows pertains to any of the processing elements.

Figure 5:
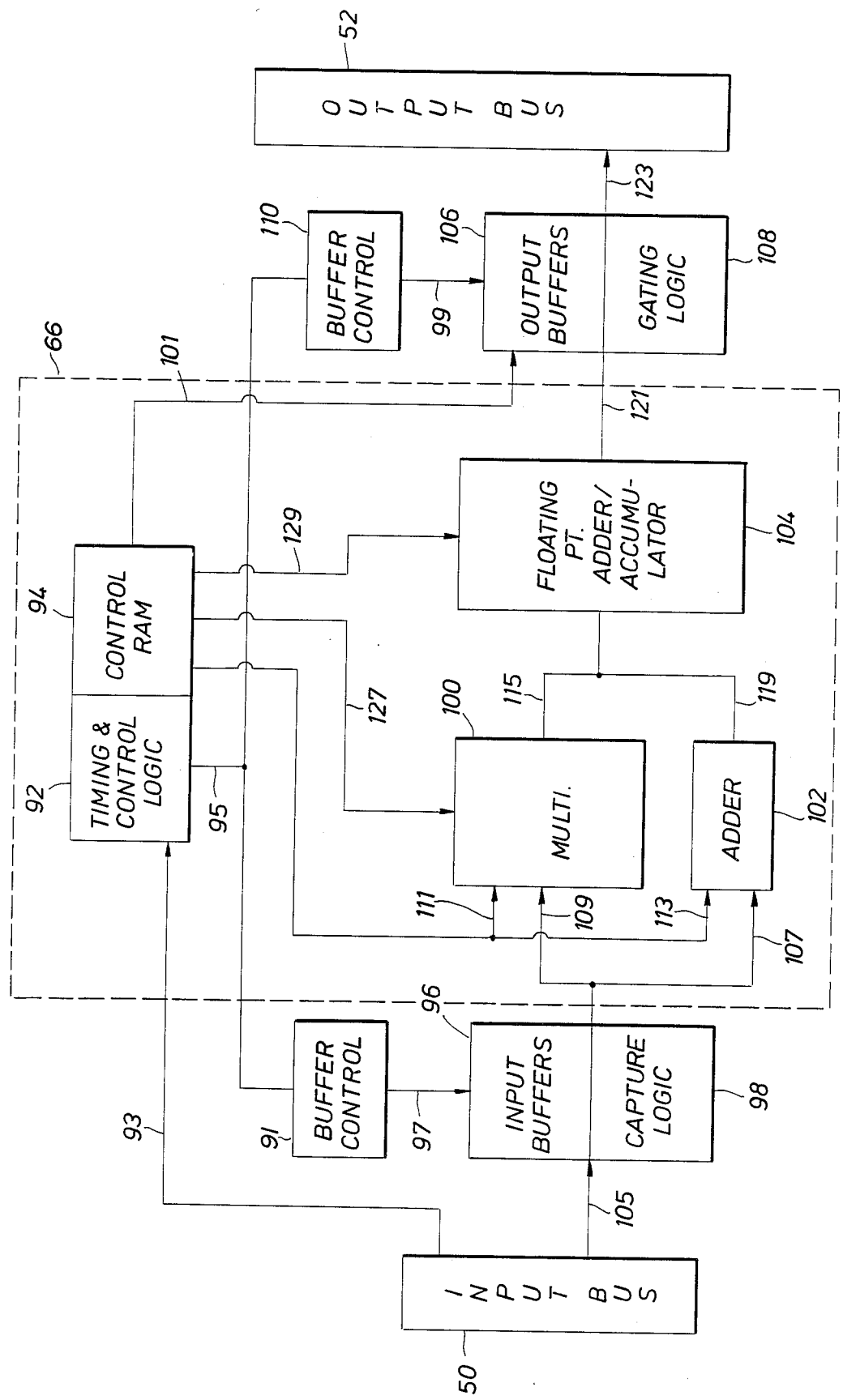
FIG. 5 is a block diagram of the signal flow of one of the processing elements of FIG. 3.

Input logic on processing element 42 includes an input selection RAM (or "random access memory") 68. It will be recalled that prior to computation of any arrays by one of the processing elements during the configuration mode, array forming information has been downloaded from control processor 30 via input bus 50. One part of this information is a list of receiver group numbers required to form all assigned arrays which is thus stored in the input selection RAM 68. More particularly, for example, if a particular processing element such as processing element 36 is desired to form arrays $A_1$ and $A_2$, whereas processing element 38 is to form arrays $A_3$ and $A_4$, during the configuration mode, control processor 30 will generate an address on input address bus 60 portion of input bus 50. If this address matches the address uniquely corresponding to processing element 36, array forming information for arrays $A_1$ and $A_2$ will be downloaded from control processor 30 on input data bus 62 and stored in input selection RAM 68 and control RAM 94 (shown in FIG. 5) of only processing element 36. Control RAM 94, timing and control logic 92, multiplier 100, adder 102, and floating point accumulator 104, discussed below with reference to FIG. 5, are functionally depicted in FIG. 4 as array forming element 66.

In like manner, control processor 30 will also address processing element 38 during the configuration mode via input address bus 60 and thereafter download on input data bus 62 array forming information relative to arrays $A_3$ and $A_4$ to be stored in input RAM 68 and control RAM 94 of the respective processing element 38. It will be recalled that this array forming information identifies which groups are in a given array, and the coefficients by which the samples of each group in each array formed by the given processing element are to be multiplied.

Thus, after the configuration mode is completed it would be expected that input selection RAM 68, control RAM 94, and output selection RAM 78 of processing element 36 would contain all information shown in the above table to specify the groups needed to form arrays 1 and 2 whereas processing element 38 would have contained in its memories all information needed for forming arrays 3 and 4 shown in the above table. More specifically, in random access memories 68, 78, and 94, respectively of processing element 36, for example, would be stored digital instructions indicating that the processing element 36 is to form samples for array 1 comprised of weighted sums of all of its group samples and the stored data further would include a plurality of stored constants $I_1-I_n$ which are the weighting coefficients for each respective group sample, and instructions regarding where to store array samples in one of output data RAMS 80 or 82.

Additionally, memories 68, 78, and 94 of processing element 36 would further include digital information indicating that array 2 is formed of the sum of weighted samples of all of the even group samples. Thus, it would also be expected that the weighting coefficients $J_2, J_4, \ldots, J_n$ would be stored in RAM 94 for forming the array 2. In general, for a given combination of arrays which are to be formed by a given processing element, RAMS 68 and 94 of the element will contain indications of which group samples $G_1$ are required for each array and the respective coefficients by which they are multiplied to form their respective arrays from the total data samples $G_1-G_n$ appearing on input data bus 62 during a scan interval. Also, output selection RAM 78 will contain information regarding when to place computed array samples on output data bus 88.

During the active mode wherein group measurements or samples are captured by the processing elements, it will be recalled that array samples are formed therefrom and delivered on output bus 52. During this mode, bus controller 34 will sequentially place the $G_1-G_n$ samples on input data bus 62 along with an indication on input address bus 60 as to which particular one of the group samples is appearing at a given time on input data bus 62. Input selection RAM 68, as hereinbefore noted, contains a sequentially ordered vector of group numbers uniquely corresponding to samples which are to be "captured" off of input data bus 62 during each one millisecond interval and which are thus required for forming all of the arrays that the particular processing element has been instructed to form.

Thus, an input address comparator 70 compares addresses delivered from address bus 60 on line 61 to a sequence of addresses delivered from RAM 68 on line 65. Each address delivered on line 61 indicates a particular one of samples $G_1-G_n$ appearing during the current scan on the input data bus 62. When the address comparator 70 detects a match between addresses appearing on lines 61 and 65, input capture logic 72 is instructed by signal 67 to capture the data corresponding to the sample of the particular group appearing at that time on input data bus 62.

As each such group data sample $G_i$ required by the particular processing element 42 is thereby captured, it is stored in one of the input data RAMS 74 or 76, the particular one being determined in a manner to be described later. After each one millisecond cycle is complete all group data samples will have appeared on input data bus 62 and each processing element will accordingly have stored in either of its respective data RAMS 74 or 76 all of the group data samples required to form all of the arrays which it has been instructed to form during the configuration stage from control processor 30. Moreover, all processing elements will also have stored in their respective control RAM 94 all weighting coefficients for each such group sample in each of the arrays to be formed by the respective processing element. Thus, the processing elements are in a state whereby they may then commence computation of all samples for all assigned arrays using group samples captured in input data RAM 74 or 76 during the previous scan interval.

With respect to operation in the computing phase of the Processing elements in more detail, from FIG. 4 it will be noted that an array forming element 66 is provided to be described in greater detail with respect to FIG. 5. In general, array forming element 66 will utilize the stored group samples captured in conjunction with the information stored in control RAM 94, regarding the array forming information (e.g., number of arrays to be formed by the processing element, identification of samples in each array and corresponding weighting coefficients for each group sample). Array forming element 66 then will generate the functional relationships such as those shown in the above table, outputting the value for each function to output data RAM 80 or 82 during each scan period (the particular one also being selected in a manner to be described later).

In like manner to the capturing of group sample data on input data bus 62, an output selection RAM 78 is provided for each processing element. It will be recalled that the output selection RAM 78 was also downloaded at configuration time. Output selection RAM 78, in like manner to input selection ram 68, generates a sequence of addresses on line 81 uniquely corresponding to the particular elements of the arrays just formed by array forming element 66. Also in like manner to the inputting mode, during the outputting mode, bus controller 34 presents a sequence of output addresses on output bus 52 which uniquely identify all of the arrays to be formed by the processing elements. These addresses are delivered on output address bus 64 through line 85 to output address comparator 84.

When the address comparator 84 detects a match between the addresses appearing on lines 81 and 85, thus indicating that the particular processing element is being addressed for delivery of the next array sample on output bus 52 to the host recording system 44 or the like, output address comparator 84 will provide an indication on line 83 to appropriate output gating logic 86. The gating logic 86 will thence gate out during this address match the array sample corresponding to the array uniquely identified by the addresses on both lines 81 and 85. These samples will appear on line 87 to output data bus 88 for delivery to bus controller 34 for transmission to host recording system 44. Output control logic will then step to the next location in output selection RAM 78.

The manner in which particular input data RAM 74 and RAM 76 or output data RAM 80 and RAM 82 is selected will next be described in greater detail. It is a feature of the present invention to provide for a "pipelined" array forming system wherein a new scan of group samples or receiver group outputs is being delivered to and stored in the processing elements simultaneously with the generation in the processing elements of their respective array samples from previously captured group samples while, at the same time, the processing elements are delivering previously calculated array samples on output bus 52.

In this manner data of incoming scans is processed through the processing elements without the delay associated with other possible approaches wherein generation of new data sets must be delayed until array samples from the prior scan are formed. In order to perform all of the above recited functions simultaneously, a double buffering technique is employed which will now be described.

It will be noted from FIG. 4 that during a given scan interval input data RAM 76 is interconnected to capture logic 72 while input data ram 74 is interconnected to array forming element 66. It is specifically contemplated that at the end of this scan interval the configuration will reverse wherein input data RAM 74 is interconnected to capture logic 72 and input data RAM 76 is interconnected to array forming element 66, this altering configuration being depicted schematically in FIG. 4 by the provision of switches 71 and 73. It will be recalled that during a given one millisecond scan interval, all of the group samples required for forming all of the arrays of a particular processing element will be captured by the processing element and stored entirely in either RAM 74 or 76 and that during a next scan interval a next set of data samples corresponding to all of the groups will appear on the input data bus 62 for capture into the other of RAMS 74 or 76.

Thus, the purpose of the double buffering arrangement of data RAMS 74 and 76 is as follows. When all of the group samples required by the particular processing element are thus captured during a scan of the groups and stored in input data RAM 76, switches 71 and 73 will reverse in preparation for capturing appropriate group samples from the data set in the next scan of the groups while at the same time permitting array forming of the previously captured samples by the array forming element 66. Thus, the previously captured samples in the just-arrived data set are now available to array forming element 66 by means of input data RAM 76 wherein they have been stored being disconnected from capture logic 72 and connected to array forming element 66.

Moreover, inasmuch as input data RAM 74 is now interconnected to input capture logic 72, and disconnected from array forming element 66, newly incoming captured group signals from the next scan appearing on input data bus 62 may thereby be captured and stored in input data RAM 74. In this manner, array forming element 66 is able continuously to process and derive array samples from a prior scan while samples from the current scan are being stored. Thus, the incoming stream of data on input data bus 62 need not be temporarily interrupted because there is no buffer available to store the data while the data storage is delivering previously captured samples to array forming element 66.

Similarly, with reference to FIG. 4, output data RAMS 80 and 82 will preferably be provided in a double buffering mode. During a given scan interval, output data ram 80 will be connected through switch 77 to output gating logic 86 while output data RAM 82 is connected through switch 75 to array forming element 66 and then alternately, during the next scan interval, output data RAM 80 is connected to array forming element 66 while output data RAM 82 is connected to output gating logic 86. The purpose of this altering configuration is similar to that of the input data RAMS 74 and 76. More particularly, by such an arrangement, array elements thus currently being derived by array forming element 66 and corresponding to one scan may be stored sequentially as generated in either output data RAM 80 or 82 while a previously generated set of array samples corresponding to a previous scan of captured group samples stored in the remaining one of output data RAMS 80 or 82 may be output on output data bus 88.

Referring now to FIG. 5, array forming element 66 of the present invention will be described in more detail. FIG. 5 depicts schematically some of the more important signal flows transpiring in processing element 42 of FIG. 4. Some of the components appearing in FIG. 4 have been repeated in FIG. 5 and renumbered simply for purposes of convenience. Starting with input bus 50, it will be recalled that all of the group samples within a given scan which may be required by the processing elements 36-42 to generate all of the arrays assigned to them will be present on line 105 during a scan interval, and that capture of the appropriate respective ones of such group sampesl by each processing element has been accomplished by means of input buffers 96 and capture logic 98. In like manner, gating logic 108 provides for the appropriate gating out of output buffers 106 by line 123 onto output bus 52 also in a manner previously described. Control bus portion 93 of input bus 50 further provides control signals to timing and control logic 92 whereby control signals are delivered on line 95 respectively to buffer controls 91 and 110, and in turn cause the appropriate toggling of the dual buffer arrangements by means of buffer control signals 97 and 99 delivered, respectively to input buffers 96 and output buffers 106.

It will also be recalled that during the configuration stage, all of the appropriate coefficients or weighting factors required for each of the arrays assigned to a given processing element will be stored such as in RAM 94. When a given group sample is to be multiplied by its corresponding coefficient, the mantissa of the sample is delivered from input buffers 96 on line 109 to digital multiplier 100 whereas the exponent thereof is delivered on line 107 from the input buffers to digital adder 102. In like manner, the mantissa of the weighting coefficient is retrieved from control RAM 94 and delivered on line 111 to multiplier 100 whereas the exponent thereof is delivered on line 113 to adder 102. The output of multiplier 100 is the multiplied result of the respective mantissas. This output signal is delivered to floating point adder/accumulator 104 on output line 115.

Inasmuch as a multiplication is being performed between the given group sample and its respective weighting coefficient, the exponents of the coefficient and the group sample are thus added in adder 102 and delivered on adder output line 119 to adder/accumulator 104. Adder/accumulator 104, in response to control signal 129 from control RAM 94 will add together each of the sequentially generated terms of the particular array function such as those shown in the above table and will accumulate the result for each array formed by the particular processing element, outputting the results in a double buffered mode on output line 121 to output buffers 106.

The last instruction in control RAM 94 will indicate completion of calculation of all array samples for a given scan interval. This will reset the control RAM 94 address counter in preparation to repeat the exact same sequence in the next scan interval.

It should be understood that the various embodiments shown are illustrative only of the inventive concept and that these embodiments should not be considered as limitations on the invention. Various changes in the methods and apparatus described herein may be within the scope of the appended claims without departing from the spirit of the invention.

What is claimed is:

1. A system for seismic exploration of an earth formation, including:
   a host digitizing system capable of generating a first plurality of digital measurements each corresponding to seismic energy received from the formation over a first time interval, and a second plurality of digital measurements each corresponding to seismic energy received from the formation over a second time interval;

a digital array former for simultaneously deriving a plurality of preselected arrays of said measurements; and a host recording system for storing said plurality of derived arrays;

wherein the digital array former includes an input bus interconnected to the host digitizing system, an output bus interconnected to said host recording system, and a plurality of parallel processing elements each having an input interconnected to the input bus and an output interconnected to the output bus, each parallel processing element also having storage means for storing array forming data functionally related to the formation of those arrays to be formed in said processing element, and an array forming element for forming arrays in functional response to the stored array forming data, said storage means including buffer means for storing the second plurality of measurements incoming on the input bus while simultaneously delivering to the array forming element the first plurality of measurements.

2. A system for seismic exploration of an earth formation, including:

a host digitizing system for deriving a first group of digital measurements each corresponding to seismic energy received from the formation during a first time interval, and a second group of digital measurements each corresponding to seismic energy received during a second time interval different from the first time interval;

a host recording system for storing a plurality of arrays derived from the measurements; and a digital array former for simultaneously deriving a plurality of preselected arrays of the measurements, said array former including an input bus connected to the host digitizing system, an output bus connected to the host recording system, and a plurality of parallel processing elements, each parallel processing element having an input connected to the input bus and an output connected to the output bus, storage means for storing array forming data functionally related to the formation of those arrays formed in said processing element, and an array forming element for forming arrays in functional response to the stored array forming data, where each parallel processor forms different respective ones of the plurality of arrays, wherein the storage means includes buffer means capable of storing the second group of measurements incoming on said input bus while delivering to said array forming element said first group of measurements.

3. The apparatus of claim 2, wherein said buffer means includes:

a first input data storage means selectively interconnectable to said input bus and to said array forming element;

a second input data storage means selectively interconnectable to said input bus or to said array forming element; and wherein each of said processing elements further includes switching means for connecting one of said first and second input data storage means to said input bus and the other of said first and second storage means to said array forming element during times functionally related to said first time intervals, and for connecting said one of said first and second input data storage means to said array forming element and the other of said first and second storage means to said input bus during times functionally related to said second time intervals.

4. The apparatus of claim 3, wherein said array forming element derives arrays corresponding to said one of said first and second groups of measurements stored in said first input data storage means when said first input data storage means is interconnected to said array forming element; and wherein said array forming element derives arrays corresponding to said one of said first and second groups of measurements stored in said second input data storage means when said second input data storage means is interconnected to said array forming element.

5. The apparatus of claim 4, further including:

a control processor interconnected to both said input bus and said output bus for delivering said array forming data on said input bus to the processing elements before said first and second pluralities of measurements are derived.

6. A system for seismic exploration of an earth formation covered by a body of water, including:

a streamer for generating seismic data sets, each set corresponding to measurements of seismic energy received at spatially distributed locations within said water;

a recorder for recording functions of said data sets;

a control processor;

an input bus;

an output bus;

a bus controller interconnected to said streamer, recorder, control processor, input bus, and output bus; and a plurality of processing elements connected in parallel, between the input bus and the output bus for deriving said functions of said data sets, wherein each processing element includes:

an input selection memory for storing certain addresses of measurements from said data sets that are required by said processing element to derive respective ones of said functions of said data sets;

an input address comparator interconnected to said input bus and said input selection memory for comparing addresses of said measurements appearing on said input bus to said certain addresses of measurements required by said processing element;

input capture logic means interconnected to said input bus and said input address comparator for capturing measurements appearing on said input bus each time said input address comparator detects corresponding between said certain addresses of said measurements on said input bus and said addresses of measurements required by said processing element;

input data storage means for storing said captured measurements;

an array forming element for deriving values for said respective ones of said functions from said captured measurements;

output data storage means for storing said derived ones of said functions;

output selection memory means for storing addresses for said values for said respective ones of said functions;

an output address comparator interconnected to said output bus and said output selection memory means for comparing addresses appearing on said output bus to addresses for said values for said respective ones of said functions; and output gating logic means interconnected to said output bus and said output address comparator for gating onto said output bus said derived functions stored in said output data storage means each time said output address comparator detects correspondence between said addresses on said output bus and said addresses for said values for said respective ones of said functions.

7. The apparatus of claim 6, wherein:
said input data storage means includes a first input data RAM and a second input data RAM;
said output data storage means includes a first output data RAM and a second output data RAM; and
each processing element further includes switching means for connecting during a first time interval said first input data RAM and said second output data RAM to said array forming element, said second input data RAM to said input capture logic means and said first output data RAM to said output gating logic means, and for connecting during a second time interval said second input data RAM and said first output data RAM to said array forming element, said first input data RAM to said input capture logic means, and said second output data RAM to said output gating logic means.

8. The apparatus of claim 7, wherein said bus controller delivers a first of said data sets on said input bus during said first time interval and a second of said data sets on said input bus during said second time interval.

9. The apparatus of claim 8, wherein said seismic data sets are digital.

10. The apparatus of claim 9, wherein said functions derived by said processing elements are derived contemporaneously with generation of said seismic data sets.

11. The apparatus of claim 10, wherein each processing element derives a different plurality of said functions of said data sets.

12. The apparatus of claim 11, wherein each of said functions of said data sets is comprised of a weighted sum of a different plurality of said measurements.

13. The apparatus of claim 12, wherein each of said processing elements includes:
a storage element for storing a plurality of weighting coefficients, each of said coefficients being associated with a different one of said measurements.

14. The apparatus of claim 13, wherein said plurality of weighting coefficients are delivered from said control processor through said bus controller on said input bus to respective ones of said processing elements and stored in respective ones of said storage elements prior to generating said seismic data sets.

15. A method for seismic exploration of a water-covered earth formation wherein samples of seismic energy from said formation are detected by spatially separated transducer groups and then processed, including the steps of:

(a) storing array information defining a first function to be formed from at least a portion of said samples;

(b) storing array information defining a second function to be formed from at least a portion of said samples;

(c) generating a first data set comprised of said samples, representing seismic energy received from the formation over a first time interval;

(d) selecting a first plurality of samples from the first data set as a function of the array information defining said first function;

(e) storing said first plurality of samples;

(f) selecting a second plurality of samples from the first data set as a function of the array information defining said second formation;

(g) storing said second plurality of samples;

(h) deriving first values for said first function from the array information defining said first function and the first plurality of samples;

(i) deriving first values for second function from the array information defining said second function and the second plurality of samples, where at least part of step (i) is performed simultaneously with at least part of step (h);

(j) recording said derived first values for said first function and said second function;

(k) generating a second data set comprised of said samples representing seismic energy received from the formation over a second time interval;

(l) selecting a third plurality of samples from the second data set as a function of the array information defining the first function;

(m) storing the third plurality of samples;

(n) selecting a fourth plurality of samples from the second data set as a function of the array information defining the second function; and (o) storing the fourth plurality of samples, where at least part of step (m) is performed simultaneously with at least part of step (h).

16. The method of claim 15, wherein at least one of said first function and said second function is comprised of the sum of at least two of said samples each multiplied by a respective weighting coefficient.

17. The method of claim 16, wherein steps (a) and (b) are performed prior to step (c).

18. The method of claim 15, wherein said first function and said second function are each comprised of the sum of a plurality of said samples each multiplied by a respective weighting coefficient.

19. The method of claim 18, wherein said stored array information defining said first function comprises:
first indications of which of said samples comprises the first function; and
first values for each of said respective weighting coefficients corresponding to each of said first indications; and
wherein said stored array information defining said second plurality of functions comprises:
second indications of which of said samples comprises the second function; and
second values for each of said respective weighting coefficients corresponding to each of said second indications.

20. The method of claim 15, further including the steps of:
(p) deriving second values for said first function from the array information defining said first function and the third plurality of samples; and (q) deriving second values for said second function from the array information defining said second function and the fourth plurality of samples; and (r) recording said derived second values for said first function and second function.

21. The method of claim 20, wherein said second values for said first and second functions are derived as a function of said derived first values for said first and second functions.

22. A method for use in deriving values for functions of seismic data sets, each set being comprised of samples taken during a different time interval from spatially distributed groups of detectors, including the steps of:

(a) storing, in each of a plurality of processing elements connected in parallel between a common input bus and a common output bus, respective array information required by said each processing element to derive said values for respective pre-assigned ones of said functions of said data sets;

(b) sequentially delivering samples comprising a first of said data sets on the input bus;

(c) retrieving from the input bus and storing in respective processing elements during a first time interval as a function of said array information, samples from said first data set required by said each processing element to derive said values for respective ones of said functions;

(d) sequentially delivering samples comprising a second of said data sets on said input bus;

(e) retrieving from said input bus and storing in respective processing elements as a function of said array information, samples from said second data set required by said each processing element to derive said values for respective ones of said functions;

(f) deriving in said each processing element said values for respective ones of said functions from said stored samples comprising said first data set, where at least part of step (e) is performed simultaneously with at least part of step (f).

23. The method of claim 22, further including the steps of:

(g) sequentially delivering samples comprising a third of said data sets on said input bus;

(h) retrieving from said input bus and storing in respective processing elements as a function of said array information, samples from said third data set required by said each processing element to derive said values for respective ones of said functions;

(i) deriving in said each processing element said values for respective ones of said functions from said stored samples comprising said second data set; and (j) storing in said each processing element values for said respective ones of said functions derived from said stored samples comprising said first data set, where at least a part of each of steps (h), (i), and (j) are performed simultaneously.

24. The method of claim 23, further including the steps of:

(k) sequentially delivering samples comprising a fourth of said data sets on said input bus;

(l) retrieving from said input bus and storing in respective processing elements as a function of said array information, samples from said fourth data set required by said each processing element to derive said values for respective ones of said functions;

(m) deriving in said each processing element said values for respective ones of said functions from said stored samples comprising said third data set;

(n) storing in said each processing element said values for said respective ones of said functions derived from said stored samples comprising said second data set; and (o) delivering on said output bus said stored values for said respective ones of said functions derived from said stored samples comprising said first data set.

25. The method of claim 24, wherein said values for respective ones of said functions derived from said stored samples comprising said third data set are further derived from at least a portion of said stored values for said respective ones of said functions derived from said stored samples comprising said first data set.

26. The method of claim 25, wherein said array information stored in each processing element comprises, for each of said ones of said functions to be derived in said each processing element:

addresses corresponding to addresses of each sample in a given data set comprising said each function; and a weighting coefficient for said each sample.

27. The method of claim 26, wherein deriving said values for respective ones of said functions comprises, for a given function and a given data set:

multiplying each sample in said data set corresponding to said given function by a corresponding one of said weighting coefficients; and summing the products of said samples in said data set and said corresponding coefficients.

28. The method of claim 27, wherein said samples delivered on said input bus are digital.

29. The method of claim 28, wherein those functions pre-assigned to a given one of said processing elements are different from those functions pre-assigned to a different one of said processing elements.

30. The method of claim 28, wherein said multiplying and summing steps performed in each processing element are performed by a respective array forming element including a digital multiplier and digital adder.

* * * * *